United States Patent
DeGrange, Jr. et al.

(10) Patent No.: US 6,614,589 B2
(45) Date of Patent: *Sep. 2, 2003

(54) METHOD AND SYSTEM FOR CONTROLLING AMPLIFIER POWER IN AN OPTICAL COMMUNICATIONS NETWORK

(75) Inventors: James E. DeGrange, Jr., Glen Burnie, MD (US); Sridhar Balakrishnan, Ellicott City, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 09/916,859

(22) Filed: Jul. 27, 2001

(65) Prior Publication Data

US 2002/0186459 A1 Dec. 12, 2002

Related U.S. Application Data

(60) Provisional application No. 60/289,672, filed on May 9, 2001.

(51) Int. Cl.[7] ............... H04J 14/02; H04B 10/00; H04B 10/02; H04B 10/12
(52) U.S. Cl. ............ 359/341.4; 359/124; 359/161; 359/164; 359/177; 359/337.11; 359/337.13; 359/341.42
(58) Field of Search ............ 359/114, 124, 359/154, 155, 161, 164, 177, 337.11, 337.13, 341.4, 341.41, 341.42, 341.43

(56) References Cited

U.S. PATENT DOCUMENTS

| | | | |
|---|---|---|---|
| 5,117,303 A | | 5/1992 | Desurvire et al. ......... 359/341 |
| 5,229,876 A | * | 7/1993 | Fatehi et al. .......... 340/870.28 |
| 5,444,238 A | | 8/1995 | Gherardi et al. ....... 250/227.11 |
| 5,471,334 A | * | 11/1995 | Masuda et al. ............ 359/176 |
| 5,485,299 A | * | 1/1996 | Jones ....................... 359/160 |
| 5,532,864 A | * | 7/1996 | Alexander et al. ......... 359/110 |
| 5,654,816 A | * | 8/1997 | Fishman ................... 359/110 |
| 5,673,129 A | * | 9/1997 | Mizrahi .................... 359/124 |
| 5,677,781 A | | 10/1997 | Mori et al. ............... 359/179 |
| 5,790,289 A | * | 8/1998 | Taga et al. ............... 359/110 |
| 5,805,322 A | * | 9/1998 | Tomofuji .................. 359/110 |
| 5,894,362 A | | 4/1999 | Onaka et al. .............. 359/124 |
| 5,917,649 A | | 6/1999 | Mori et al. ............... 359/341 |
| 5,963,361 A | | 10/1999 | Taylor et al. ............. 359/337 |
| 5,978,115 A | | 11/1999 | Condict et al. ........... 359/124 |
| 5,986,782 A | * | 11/1999 | Alexander et al. ......... 359/110 |
| 6,023,366 A | | 2/2000 | Kinoshita ................. 359/341 |
| 6,040,933 A | * | 3/2000 | Khaleghi et al. .......... 359/110 |
| 6,072,601 A | * | 6/2000 | Toyohara .................. 358/484 |
| 6,137,605 A | | 10/2000 | Watanabe .................. 359/124 |
| 6,163,392 A | * | 12/2000 | Condict et al. ........... 359/118 |
| 6,163,399 A | * | 12/2000 | Berg ........................ 359/124 |

(List continued on next page.)

FOREIGN PATENT DOCUMENTS

EP    1 113 597   * 7/2001

OTHER PUBLICATIONS

"PCT International Search Report" PCT/US02/14183, established Nov. 27, 2002.

Primary Examiner—Thomas G. Black
Assistant Examiner—Andrew R Sommer
(74) Attorney, Agent, or Firm—Michael R. Cammarata; David A. Fox

(57) ABSTRACT

The invention includes a method for controlling amplifier output power in an optical communications network. A first transmission parameter is determined at a first amplifier. In an exemplary embodiment, the first transmission parameter is a composite express signal to noise ratio. The total output power of a downstream amplifier is adjusted in response to the first transmission parameter. A system for implementing the method is also disclosed.

12 Claims, 8 Drawing Sheets

U.S. PATENT DOCUMENTS

| | | |
|---|---|---|
| 6,198,571 B1 | 3/2001 | Yang .......................... 359/337 |
| 6,219,162 B1 | 4/2001 | Barnard et al. ............. 359/124 |
| 6,259,543 B1 * | 7/2001 | Golovchenko et al. ..... 359/110 |
| 6,259,553 B1 * | 7/2001 | Kinoshita ................... 359/124 |
| 6,335,810 B1 * | 1/2002 | Uehara ....................... 359/110 |
| 6,344,915 B1 * | 2/2002 | Alexander et al. .......... 359/134 |
| 6,404,523 B1 * | 6/2002 | Morikawa et al. .......... 359/124 |
| 6,421,167 B1 * | 7/2002 | Cohen et al. ............... 359/337 |
| 6,433,903 B1 * | 8/2002 | Barry et al. ................. 359/124 |
| 6,441,955 B1 * | 8/2002 | Takatsu et al. ............. 359/142 |
| 2002/0101630 A1 * | 8/2002 | Nikolich ..................... 359/110 |

* cited by examiner

METHOD AND SYSTEM FOR CONTROLLING AMPLIFIER POWER IN AN OPTICAL COMMUNICATIONS NETWORK

CROSS-REFERENCE TO RELATED APPLICATIONS

This application claims the benefit of U.S. provisional application serial No. 60/289,672, filed May 9, 2001, the entire contents of which are incorporated herein by reference.

BACKGROUND OF THE INVENTION

1. Field of Invention

The invention relates generally to a method and system for controlling amplifier power in an optical communications network.

2. Description of Related Art

Wavelength division multiplexing (WDM) has been used to increase the capacity of existing fiber optic networks. In a WDM system, plural optical signal channels are carried over a single optical fiber with each channel being assigned a particular wavelength. Such systems typically include a plurality of receivers, each detecting a respective channel by effectively filtering out the remaining channels.

Optical channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50 km without significant attenuation. For distances beyond 50 km, however, optical amplifiers are used to compensate for optical fiber loss.

Optical amplifiers have been developed which include an optical fiber doped with erbium known as erbium-doped fiber amplifiers or EDFAs. The erbium-doped fiber is "pumped" with light at a selected wavelength, e.g., 980 nm, to provide amplification or gain at wavelengths within the low loss window of the optical fiber. Other types of optical amplifiers include erbium-doped waveguide amplifiers (EDWA), semiconductor optical amplifiers (SOA).

When optical amplifiers are cascaded in series along a transmission span, noise generated at each amplifier degrades the signal to noise ratio. FIG. 1 is a block diagram of a conventional optical communications network having a plurality of amplifiers $10_1$, $10_2$ and $10_3$ positioned along transmission fiber $12_1$, $12_2$ and $12_3$. The output of each amplifier includes noise in the form of amplified spontaneous emissions (ASE) and at least one signal as shown in FIG. 1. It is understood that a WDM system may carry multiple signals on separate channels and a single signal is shown for ease of illustration.

As is known in the art, at each amplifier stage the ASE increases due to the amplification of ASE input to the amplifier and ASE added at the amplifier. If, however, the output power of the amplifiers $10_1$, $10_2$ and $10_3$ are equal, then the signal component is decreased to accommodate for the increase in ASE. For example, if the total output power of each amplifier is 8 mw, the power available for the signal is reduced as the ASE power increases from one amplifier to the next. As shown in FIG. 1, setting the output power of each amplifier equal results in a decreased signal-to-noise ratio (SNR) as the signal passes through multiple amplifiers.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

SUMMARY OF THE INVENTION

The invention includes a method for controlling amplifier output power in an optical communications network. A first transmission parameter is determined at a first amplifier. In an exemplary embodiment, the first transmission parameter is a composite express signal to noise ratio. The total output power of a downstream amplifier is adjusted in response to the first transmission parameter. A system for implementing the method is also disclosed.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
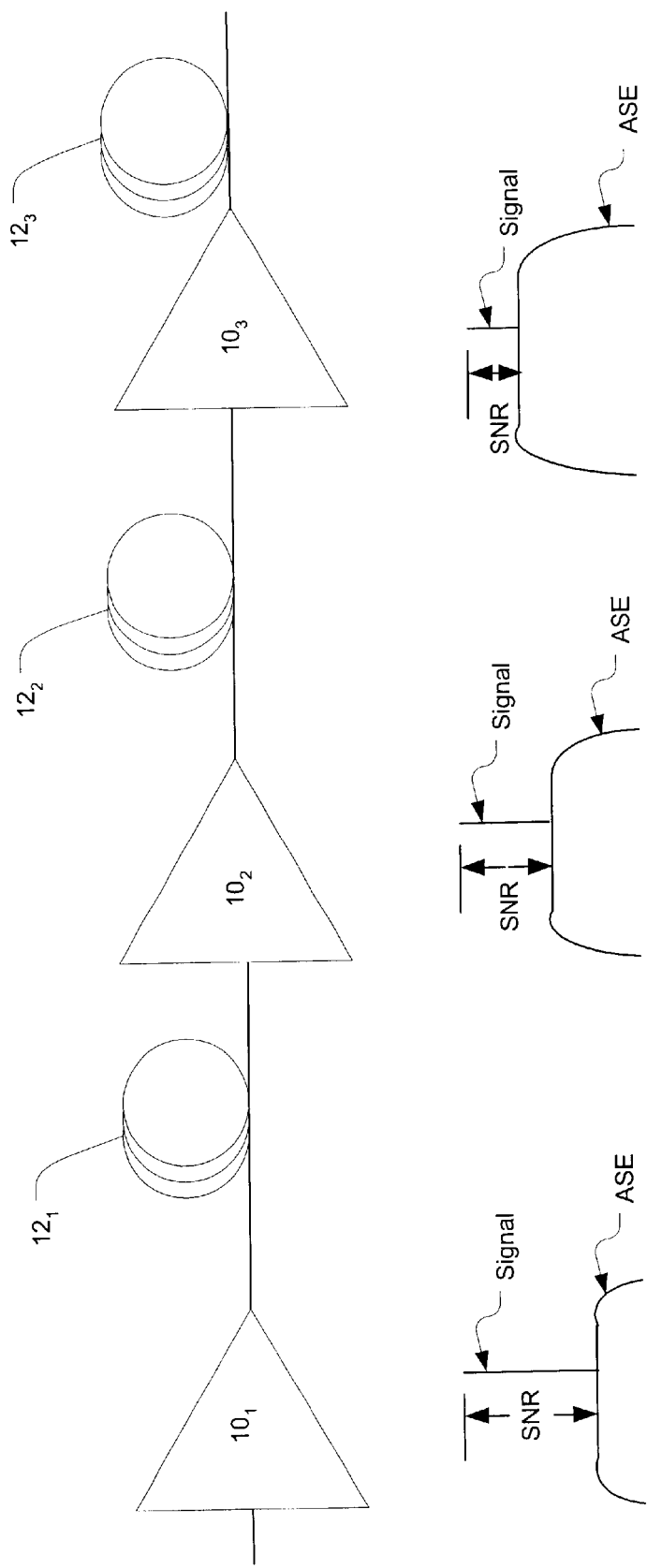
FIG. 1 is a block diagram of a portion of a conventional optical communications network.
Figure 2:
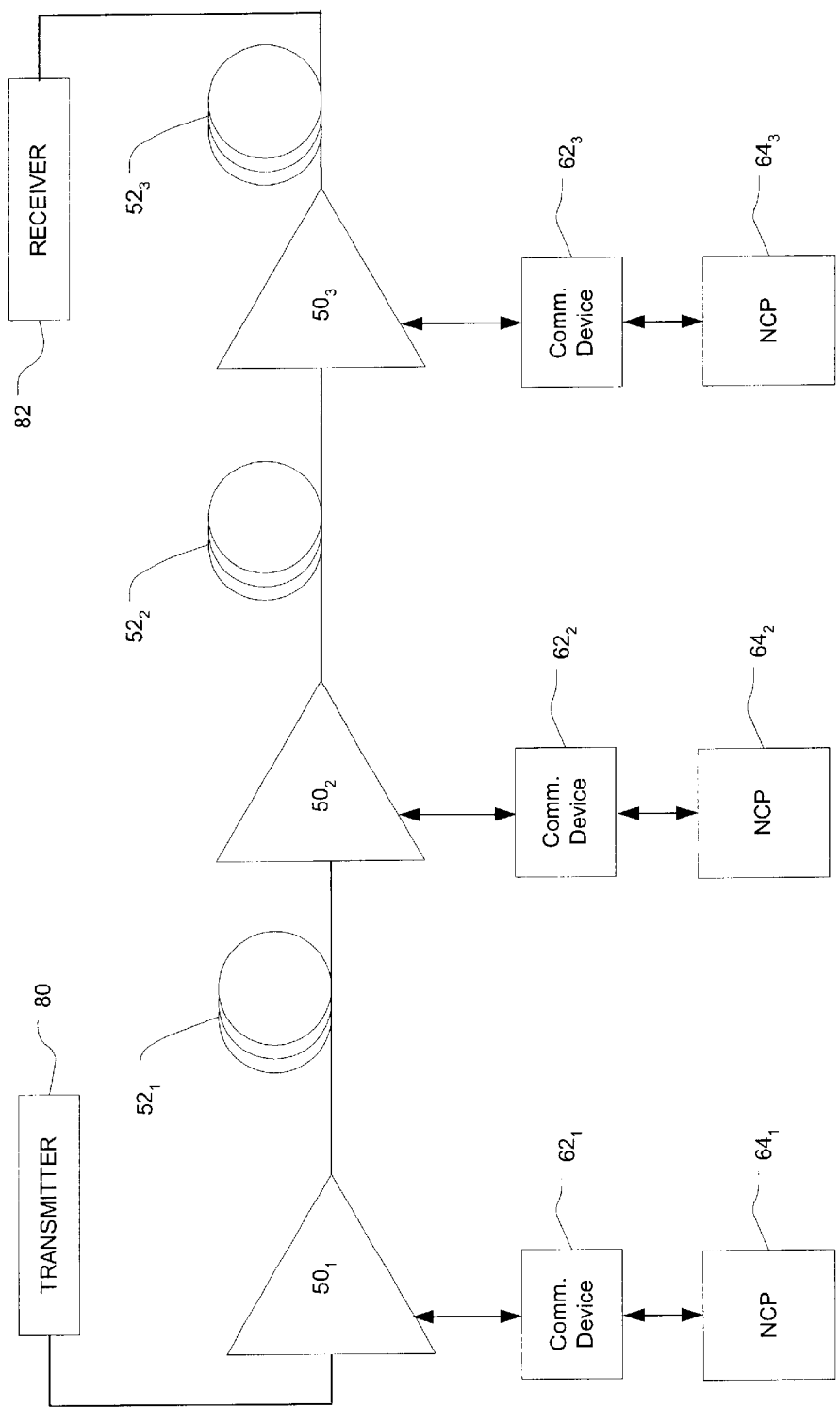
FIG. 2 is a block diagram of a portion of an optical communications network in an embodiment of the invention.

FIG. 2 is a block diagram of a portion of an optical communications network in an embodiment of the invention. The optical communications network provides communications between transmitter 80 and receiver 82. In an exemplary embodiment, the optical communications system is a WDM system in which the transmitter 80 generates a plurality of signals, each on a separate wavelength or channel. Receiver 82 detects the individual channels as known in the art.

The optical communications network includes a number of amplifiers $50_1$, $50_2$ and $50_3$ which may be implemented using EDFAs. The amplifiers 50 serve as signal regeneration points along sections of transmission fiber $52_1$, $52_2$, $52_3$. It is understood that other components may be included in the transmission span such as switches, couplers, etc.

Each amplifier 50 is in communication with a communications device 62 and an associated node control processor (NCP) 64. NCP 64 may be a microprocessor-based controller executing a computer program to determine the total output power for one or more amplifiers 50. It is understood that a one-to-one correspondence between amplifiers 50 and NCPs 64 is not required. An NCP 64 may interface with a plurality of amplifiers 50 or a single master NCP may interface with all amplifiers. The communications device 62 may be implemented using a service channel modem (SCM). Service channel modems may provide for communications between network elements as described in further detail in U.S. Pat. Nos. 6,163,392, 5,978,115 and 5,532,864, the entire contents of which are incorporated herein by reference. The NCPs 64 monitor transmission parameters at each amplifier 50 and communicate with amplifiers 50 and other NCPs 64 via communication devices 62.

In an exemplary embodiment, the NCPs communicate over a service channel defined by one or more wavelengths (e.g., 1625 nm) carried on transmission fiber 52. The communications devices 62 use this wavelength to communicate without interfering with the signals carried on separate wavelengths. Alternatively, the NCPs may communicate over another communications network separate from transmission fiber 52.

In operation, the NCPs 64 adjust the output power at each amplifier 50 so that the SNR for each channel remains substantially constant over the entire transmission span. Each NCP shares transmission parameters with other NCPs to adjust the output power at each amplifier. In an exemplary embodiment, each NCP 64 stores a network profile identifying the network elements in the transmission span. Thus, each NCP 64 knows its position in the communications network along with other transmission parameters such as the number of channels input and output at each amplifier, SNR at each amplifier, etc.

Two exemplary embodiments of the invention are described herein. With reference to FIG. 2, in a first embodiment it is assumed that the number of channels transmitted along the transmission span does not vary. Thus, if 16 channels are sent by transmitter 80, the same 16 channels are received at receiver 82. In the second embodiment described with reference to FIGS. 3–5, add/drop multiplexers 54 are positioned in the transmission span to provide the ability to add and/or drop channels.

Referring to FIG. 2, each NCP 64 adjusts the total output power of a corresponding amplifier 50 based on at least one transmission parameter obtained from an upstream amplifier. The term "upstream" refers to a direction opposite the transmitter-receiver path. The term downstream refers to a direction consistent with the transmitter-receiver path. At each amplifier location, the NCP 64 determines the signal output power and the composite express output power. These values are used to determine the total output power for the amplifier. The signal output power may be calculated based on channel count, channel plan information, and power adjustments (e.g., fiber type adjustment, user-defined power adjustment). The composite express output power may be determined by the sum of the signal output power, the upstream ASE power and the current amplifier ASE power. Alternatively, one or both of the signal output power and the composite express output power can be measured.

From the above output power values, a composite express signal-to-noise ratio (snr_ratio) may be calculated at each NCP 64 which is communicated to downstream NCPs (and optionally upstream and downstream NCPs) in the transmission span via communication devices 62. The composite express signal-to-noise ratio at an amplifier output may be calculated by dividing the signal output power by the composite express output power. The composite express output power may be calculated based on knowledge of the immediate upstream amplifier's composite express signal-to-noise ratio. The upstream composite express signal-to-noise ratio may be defined as 1 for the first amplifier (e.g., amplifier $50_1$) in a transmission span.

A derivation of the calculation performed to determine the appropriate output power at an amplifier is provided below. The following variables are used in the derivation.

$Pin_j$: Total Input Power of amp j (not including power associated with communication device 62).

$Pout_j$: Total Output Power at amp j (not including power associated with communication device 62).

$Pout\_express_j$: Total Output Power at amp j assuming no blocks (not including power associated with communication device 62).

$Psig\_in_j$: Total Signal Input Power at amp j=$Psig\_out_{j-1}$/$Loss_j$ $Psig\_out_j$: Composite Signal Output Power at amp j.

$Gain_j$: Gain of amp j=$(Psig\_out_j/Nout_j)/(Psig\_in_j/Nout_j)$ $Loss_j$: Fiber Loss from output of j–1 amp to input of amp j=$10^{\wedge}(Fiber\ Loss_j/10)$ $Snr\_ratio_j$: Ratio of the composite signal power to total output power at Amp j calculated as if there were no added/dropped channels in the transmission span.

$Pase\_express_j$: Total ASE power at output of Amplifier j assuming no blocks $Pase_j$: Total ASE power at output of Amplifier j.

$Padded\_ase_j$: Added ASE power at Amplifier j. This ratio may be defined at the output of the amplifier.

Equation (11) below is used to determine the total output power $Pout\_express_i$ for the $i^{th}$ amplifier so that the signal-to-noise ratio along the transmission span remains substantially constant. Equation (11) is derived as follows.

First, the signal output power is defined as shown in equation (1) where $Padj_i$ is a user-defined power adjustment factor for the $i^{th}$ amplifier.

$$Psig\_out_i = linearValue(REF1) * 10^{\wedge}(Padj_i/10) \quad (1)$$

The quantity linearValue(REF1) designates a signal output power based on a predetermined channel power multiplied by the number of output channels. In an exemplary embodiment, this value is 0.6 mw multiplied by the number of output channels. As described in further detail herein, the channels may be weighted to define channel units in which case the signal output power is the per channel unit power multiplied by the number of channel units. Defining channel power based on channel units provides more accurate power allocation. A channel is assigned a number of channel units based on transmission factors such as transmission rate and transmission format. The power allocated that channel is then determined based on the number of channel units.

The power adjustment value $Padj_i$ is a user-defined power adjustment. The amplifiers are specified to output the signal at some predefined level (e.g., –2 dBm per channel). The power adjustment value $Padj_i$ allows the user to adjust this level. For example, the power adjustment value may be 1 dB causing the amplifier to output the signal at –1 dBm per channel.

The total output power is represented as shown in equation (2). As can be seen, the total output power is a sum of the signal output power $Psig\_out_i$, ASE power from the preceding ($i-1^{th}$) amplifier which is amplified at the $i^{th}$ amplifier and any ASE power added at the $i^{th}$ amplifier.

$$Pout\_express_i = Psig\_out_i + Pase\_express_{i-1} * (Gain_i/Loss_i) + Padded\_ase_i \quad (2)$$

where: $Pase_0 = 0$.

The composite express signal-to-noise ratio ($snr\_ratio_i$) may be defined as the ratio of output signal power to the total output power. Again, with reference to FIG. 2, it is assumed that no add/drop multiplexers (ADMs) are located in the transmission span. This provides a direct measure of the added ASE power between two amplifiers in the transmission span. The composite express signal-to-noise ratio is defined as:

$$snr\_ratio_i = Psig\_out_i/Pout\_express_i \quad (3)$$

$$= Psig\_out_i/(Psig\_out_i + Pase\_express_{i-1} * (Gain_i/Loss_i) + Padded\_ase_i). \quad (4)$$

The ($Pase\_express_{i-1} * (Gain_i/Loss_i)$) term may be represented using the following:

$$Pase\_express_{i-1} = Pout\_express_{i-1} - Psig\_out_{i-1} \quad (5)$$

$$= Psig\_out_{i-1} * (1/snr\_ratio_{i-1} - 1) \quad (6)$$

$$Psig\_out_{i-1} = Psig\_in_i * Loss_i \quad (7)$$

$$Gain_i = (Psig\_out_i/Nout_i)/(Psig\_in_i/Nin_i). \quad (8)$$

Inserting equations (7) and (8) into equation (6) gives:

$$Pase\_express_{i-1} * (Gain_i/Loss_i) = (Nin_i/Nout_i) * Psig\_out_i * (1/snr\_ratio_{i-1} - 1). \quad (9)$$

Inserting equation (9) into equation (2) yields:

$$Pout\_express_i = Psig\_out_i * (1 + (Nin_i/Nout_i) * (1/snr\_ratio_{i-1} - 1)) + Padded\_ase_i. \quad (10)$$

In the embodiment shown in FIG. 2, the number of channels across the transmission span remains constant so $Nin_i$ and $Nout_i$ are equal. Thus, equation (10) reduces to $$Pout\_express_i = Psig\_out_i/snr\_ratio_{i-1} + Padded\_ase_i \quad (11)$$

The power attributable to ASE added at the $i^{th}$ amplifier may be derived as follows:

$$Padded\_ase_i = 10log(F_{ase}(gain) * ((Psig\_out_i/Nout_i)/((Pin_{current\_val}/Nin_i) * sig\_ratio_{i-1}) + 1) * 6.1334 * 10^{-4}).$$

$F_{ase}(gain)$ is the ASE gain for the $i^{th}$ amplifier. This value may be retrieved from a table indexed by the per-channel gain as calculated by $$10log((Pout_{current\_val}/Nout_i)/((Pin_{current\_val}/Nin_i) * sig\_ratio_{i-1}) + 1)$$

where $Psig\_out$ = calculated signal output power level of amplifier i in mW $Pin_{current\_val}$ = measured input power level (current value) of amplifier i in mW $Nin_i$ = number of input channel at amplifier i $Nout_i$ = number of output channel at amplifier i.

In the embodiment of FIG. 2, the number of input channels equals the number of output channels at each amplifier along the transmission span. As described in further detail herein, each channel may be weighted to define channel units in which case the signal output power is the per channel unit power multiplied by the number of channel units. Defining channel power based on channel units provides more accurate power allocation.

It can be seen from equation (11) that the composite express signal-to-noise ratio from the i–$1^{th}$ amplifier is used to determine the output power for the $i^{th}$ amplifier. It is understood that transmission parameters other than composite express signal-to-noise ratio may be used to determine the output power of downstream amplifiers. For example, the channel count N may be used by downstream amplifiers to establish the signal power.

The calculation of output power in equation (11) does not include power used to provide a service channel for the communications devices 62 if present on the transmission fiber 52. This service channel for the communications devices 62 may be outside the amplification band of amplifiers 50 and thus is not included in equations (1)–(11). An additional power offset (e.g., 2 mw) may be added to the output power determined in equation (11) to provide for the service channel utilized by communications devices 62.

The service channel utilized by communications devices 62 is preferably an "out-of-band channel", meaning that this communications channel is distanced from the channels carrying the transmission signals. In an exemplary embodiment, the out-of-band service channel is 1625 nm. This wavelength is preferable because it is not affected by amplifiers 50 and may still be utilized even if amplifiers 50 are inoperative.

To illustrate determination of amplifier output power, reference is made to FIG. 2. In an exemplary embodiment, $NCP\ 64_1$ sets the output power of amplifier $50_1$ based on equation (11). Because amplifier $50_1$ is the first amplifier in the transmission span, the value of the upstream composite express signal-to-noise ratio ($snr\_ratio_0$) is set to 1. $NCP\ 64_1$ determines the composite express signal-to-noise ratio ($snr\_ratio_1$) and broadcasts this transmission parameter to at least the immediate downstream $NCP\ 64_2$, if not multiple upstream and downstream NCPs.

At amplifier $50_2$, $NCP\ 64_2$ determines the appropriate output power based on equation (11). The value for the composite express signal-to-noise ratio ($snr\_ratio_1$) has been received from $NCP\ 64_1$. $NCP\ 64_2$ determines the composite express signal-to-noise ratio ($snr\_ratio_2$) and broadcasts this value to at least the immediate downstream $NCP\ 64_3$, if not all NCPs. Typically, the output power of each successive amplifier is increased as the signal proceeds along the transmission span to maintain the signal-to-noise ratio for each channel substantially constant.

Figure 6:
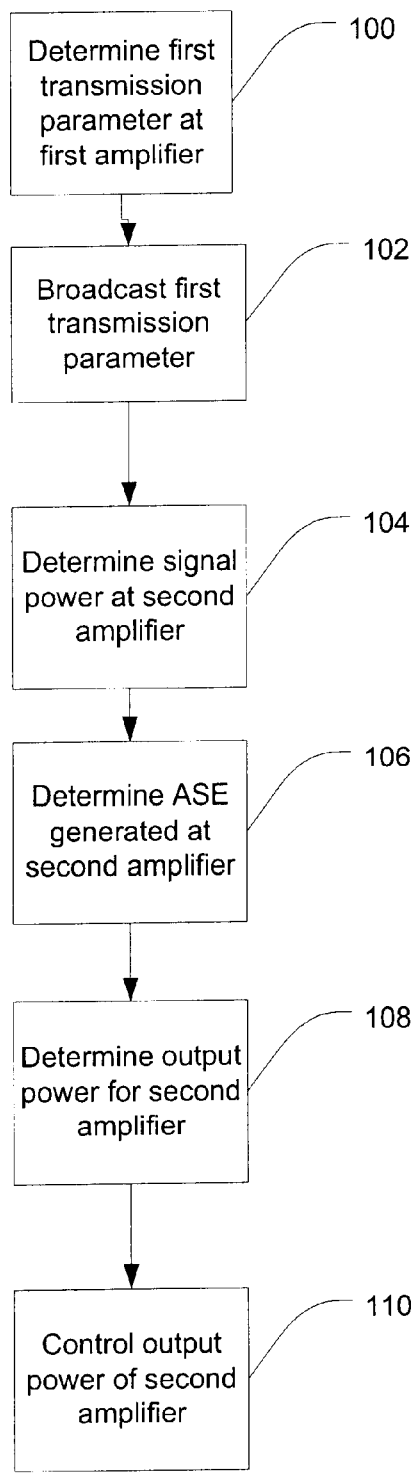
FIG. 6 is a flowchart of a method of controlling amplifier power in a first embodiment of the invention.

An exemplary process of controlling the output power of an amplifier, where no channels are added or dropped, is depicted in FIG. 6. At step 100, the first transmission parameter (e.g., composite express signal-to-noise ratio) is determined for a first amplifier and this transmission parameter is broadcast to other network elements at step 102. At step 104, signal output power for the second amplifier is determined and at step 106, amplified spontaneous emission generated at the second amplifier is determined. The proper amount of output power for the second amplifier is determined at step 108 is response to the first transmission parameter, the signal output power for the second amplifier and amplified spontaneous emission generated at the second amplifier. This determined value is then used to control output power of the second amplifier at step 110.

Figure 3:
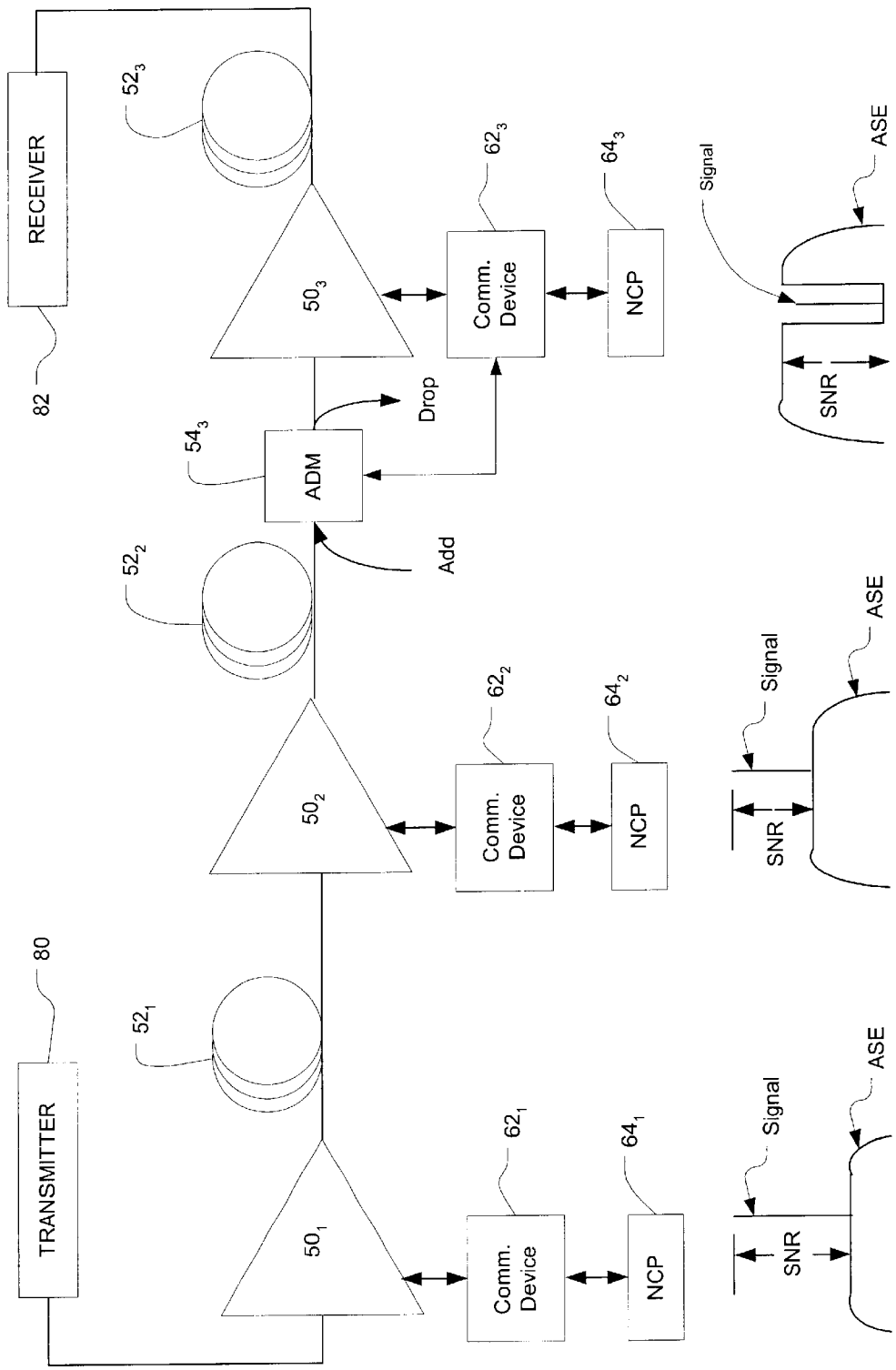
FIG. 3 is a block diagram of a portion of an optical communications network in an alternate embodiment of the invention.

In an alternate embodiment of the invention shown in FIG. 3, the communication network has the ability to add and/or drop channels along the transmission span. This may be accomplished through an add/drop multiplexer 54 which may be implemented using an optical add/drop multiplexer (OADM). Alternatively, amplifiers 50 may include components to provide the add/drop function.

When channels can be added and/or dropped, the ASE may vary for each channel depending on whether the channel has been added or dropped and the type of drop. A drop where a section of the bandwidth is attenuated (including ASE and signal) and thus prevented from continuing down the span is referred to as a block. Such a block may be accomplished through gratings, filters, etc. The block substantially eliminates all power (ASE, signal, etc) for a section of bandwidth downstream of the OADM. The degree of attenuation is limited by the efficiency of the component performing the block.

For example, reference is made to FIG. 3 which depicts a single signal being carried on one channel. The signal and ASE are depicted below each corresponding amplifier 50. Assume that prior to amplifier $50_3$ at add/drop element $54_3$, the signal is blocked (e.g., delivered to a recipient) and a new signal is added on the same channel. As shown in FIG. 3, the ASE associated with the newly added signal is zero. Thus, the determination of amplifier output power will vary based on whether and where in the transmission span channels were added and/or blocked.

The block-type drop is contrasted with a drop-and-continue. When a drop-and-continue is performed, the signal and ASE are dropped from a first transmission path and routed to a second transmission path without attenuation. Thus, in a drop-and-continue, the downstream amplifier in the second transmission path does not need to compensate for a reduction in ASE.

The NCPs adjust output power of a respective amplifier to accommodate for ASE power reduction due to blocked channels. A downstream amplifier determines the amount of ASE blocked by upstream network elements. This determination may be performed by receiving transmission parameters (e.g., signal-to-noise values, channel counts, etc.) from upstream elements and determining the amount of ASE power blocked upstream. Alternatively, ASE power may be measured at points along the transmission path. Based on the amount of ASE power blocked upstream, the downstream amplifier output power is adjusted accordingly.

In an exemplary embodiment, each NCP determines signal output power, composite express output power and composite output power. Alternatively, one or more of these powers may be measured. The signal output power and composite express output power are determined as described above with reference to FIG. 2. The composite output power is the amplifier output power taking into account the effects of ASE power being blocked by one or more ADMs upstream in the transmission span.

From these three power values, a composite express signal-to-noise ratio and a composite signal-to-noise ratio are determined. The composite express signal-to-noise ratio (snr_ratio) is determined as described above with reference to FIG. 2. The composite signal-to-noise ratio (sig_ratio) at an amplifier output is calculated by dividing the signal output power by the composite output power. The composite express signal-to-noise ratio (snr_ratio) and the composite signal-to-noise ratio (sig_ratio) may be calculated at each NCP 64 and then communicated to downstream NCPs (and optionally all NCPs) in the transmission span.

In the embodiment of FIG. 3, each NCP 64 determines amplifier total output power based on the upstream amplifier's composite signal-to-noise ratio (sig_ratio) as well as the composite express signal-to-noise ratio (snr_ratio) at all upstream amplifier's at ADM sites. The upstream composite signal-to-noise ratio (sig_ratio) and the composite express signal-to-noise ratio (snr_ratio) used by the first amplifier in a transmission span are implicitly defined as 1.

A derivation of the calculation performed to determine the total output power at an amplifier, including adjustments for adds/blocks, is provided below. In addition to the variables described above with reference to FIG. 2, the following variable is used in the derivation.

Sig_ratio$_j$: Ratio of Composite Output Signal Power to Total Output Power at Amp j. This ratio may be defined at the output of the amplifier.

Equation (22) below is used to determine the proper signal output Pout$_i$ for the $i^{th}$ amplifier so that the signal-to-noise ratio for each channel along the transmission span remains substantially constant. Equation (22) is derived as follows.

The output power at the $i^{th}$ amplifier is first established as shown in equations (12)–(14).

$$Pout_i = \text{Total output power (not including communication device 62 power) at amp}_i \quad (12)$$

$$sig\_ratio_i = Psig\_out_i/Pout_i \quad (13)$$

$$Pout_i = Psig\_out_i + Pase_{i-1}*(Gain_i/Loss_i) + Padded\_ase_i. \quad (14)$$

Performing the same substitutions as in equations (5) through (9) above, except for defining:

$$Pase_{i-1} = Pout_{i-1} - Psig\_out_{i-1} \quad (15)$$

$$= Psig\_out_{i-1}*(1/sig\_ratio_{i-1} - 1) \quad (16)$$

yields:

$$Pase_{i-1}*(Gain_i/Loss_i) = (Nin_i/Nout_i)*Psig\_out_i*(1/sig\_ratio_{i-1} - 1). \quad (17)$$

Substituting equation (17) into equation (14) and combining terms, yields:

$$Pout_i = Psig\_out_i*(1 + (Nin_i/Nout_i)*(1/sig\_ratio_{i-1} - 1)) + Padded\_ase_i. \quad (18)$$

If the number of input channels (Nin$_i$) and the number of output channels (Nout$_i$) are the same at an amplifier, then equation (18) is reduced to:

$$Pout_i = Psig\_out_i/sig\_ratio_{i-1} + Padded\_ase_i. \quad (19)$$

Adjusting equation (19) for added and blocked channels provides:

$$Pout_i = Pout_i - \Sigma_{ch}(Pase\_express_{i-1}*(Gain_i/Loss_i) - Pase\_express_k)*filt\_bw_{ch}. \quad (20)$$

Subscript ch designates each channel on the current amplifier that has been blocked. Variable Pase$_k$ is the total ASE power at the output of amplifier "k" which is the amplifier positioned after the first upstream element blocking channel ch. The subscript "k" is used with variables corresponding to the first amplifier upstream of amplifier "i" where channel ch has been blocked. For example, referring to FIG. 4, amplifier "k" is amplifier $50_1$ which is positioned immediately after the first upstream element, ADM $54_1$, blocking channel ch. Variable filt_bw$_{ch}$ is a variable dependent on the type of block used in the ADM.

Figure 4:
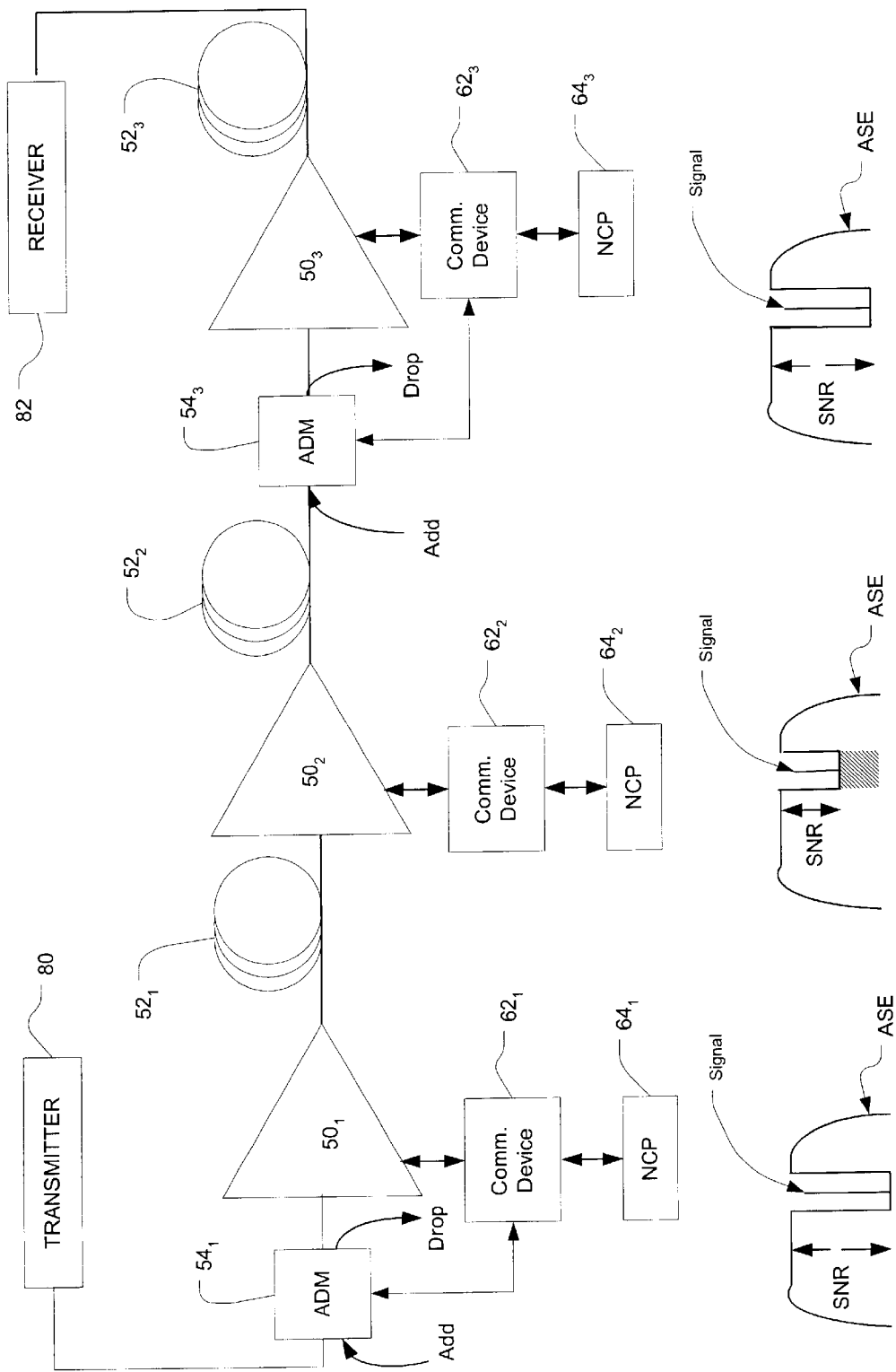
FIG. 4 depicts the effect of adding and dropping channels along the optical communications network.

Equation (20) allows the proper amount of ASE to be subtracted from the amplifier total output power. FIG. 4 depicts the subtraction of ASE provided by equation (20) for determining the output power at amplifier $50_3$. Assume that prior to amplifier $50_1$, a channel is blocked (e.g., delivered to a recipient) and added back in (e.g., a new signal is submitted) at ADM $54_1$. At amplifier $50_1$, the ASE for that channel substantially zero. As the signal passes through amplifier $50_2$, the ASE is increased for all channels, including the added channel. At ADM $54_3$, the channel is again blocked and added to place the ASE power for that channel substantially equal to zero. The output power of the amplifier $50_3$ needs to be compensated to reflect the loss of ASE power for this channel between the output of amplifier $50_2$ and the input of amplifier $50_3$.

To determine the amount of ASE power lost, equation (20) dictates that the amplified ASE power from the previous amplifier, $Pase\_express_{i-1}*(Gain_1/Loss_i)$, is reduced by the ASE power at the first network element where the channel was blocked, $Pase\_express_k$. Relating to FIG. 4, this corresponds to subtracting the ASE power at amplifier $50_1$ from the ASE power at amplifier $50_2$. This determines the amount of ASE power (shown cross-hashed in FIG. 4) reduced through the block at ADM $54_3$.

Figure 5A:
FIGS. 5A and 5B illustrate two different techniques for dropping channels.
Figure 5A:
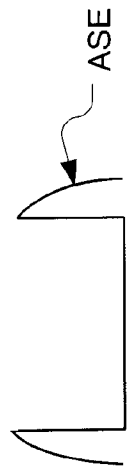
Figure 5B:
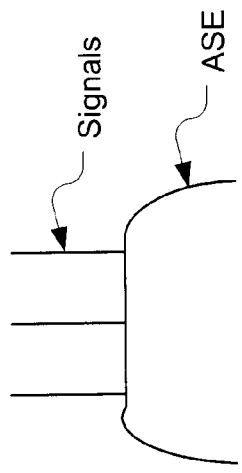

The ASE power adjustment variable $filt\_bw_{ch}$ adjusts the amount of ASE power subtracted due to blocked channels. The ASE power adjustment variable may take on different values depending on the type of channel block that is employed. As shown in FIG. 5A, a first type of block used in the art is a channel-by-channel block. This type of block attenuates the signal and associated ASE in individually, spaced channels. Thus, some ASE power remains un-blocked between the blocked channels. A second type of block is a band block in which an entire range of wavelengths is removed. As shown in FIG. 5B, all signals and all associated ASE within a band are removed.

Referring to equation (20), if a channel-by-channel block is employed, then the ASE power adjustment variable $filt\_bw_{ch}$ has a value smaller than if a band block is used. This is due to the fact that more ASE power should be subtracted when a band block is used. In an exemplary embodiment, the ASE power adjustment variable $filt\_bw_{ch}$ is about 0.005 if a channel-by-channel block is used and about 0.010 if a band block is used. It is understood that other values may be used depending on a variety on network characteristics such as channel spacing, etc.

In the second embodiment, the number of signals can vary from one amplifier to the next given the add/drop functionality. The signal power at the network element where the channel was first blocked is represented as $$Psig\_out_k = Psig\_out_i*(Nout_k/Nout_i)*(10^{(Padj_k/10)}/10log(Padj_i/10)). \quad (21)$$

$Nout_k$ and $Nout_i$ represent the number of channels output at the amplifier where the channel was first blocked and the current amplifier, respectively. As described in further detail herein, the number of channels may be represented as channel units to effectively weight the channels and accurately allocate power to each channel. $Padj_k$ and $Padj_i$ are user-defined power adjustment factors (e.g., measured in dB) for the amplifier where the channel was first blocked and the current amplifier, respectively.

Substituting equations (6), (9), and (21) into equation (20) yields equation (22) as follows:

$$Pout_i = Psig\_out_i*(1$$
$$+(Nin_i/Nout_i)*(1/sig\_ratio_{i-1}-1))+Padded\_ase_i$$
$$-\Sigma_{ch}Psig\_out_i$$
$$*((Nin_i/Nout_i)*(1/snr\_ratio_{i-1}-1)-(Nout_k/Nout_i)$$
$$*(10log(Padj_k/10)/10log$$
$$(Padj_i/10))*(1/snr\_ratio_{i-1}-1))$$
$$*filt\_bw_{ch}.$$

As evident from equation (22) and the above description, in the second embodiment, the power at the $i^{th}$ amplifier is dependent on a first transmission parameter (composite signal-to-noise ratio sig_ratio) and a second transmission parameter (composite express signal-to-noise ratio snr_ratio) from the i–1$^{th}$ amplifier. The output power at the i$^{th}$ amplifier is also dependent on whether channels have been blocked along the transmission span and the type of block (band or channel) performed through ASE power adjustment variable $filt\_bw_{ch}$. Thus, the number of channels output at each amplifier is broadcast to the NCPs 64. As described above, additional power (e.g. 2 mw) may be added to the output power determined in equation (22) to provide for the channel utilized by communications devices 62. Preferably, this communications channel is an out-of-band channel as described above with reference to FIG. 2.

Figure 7:
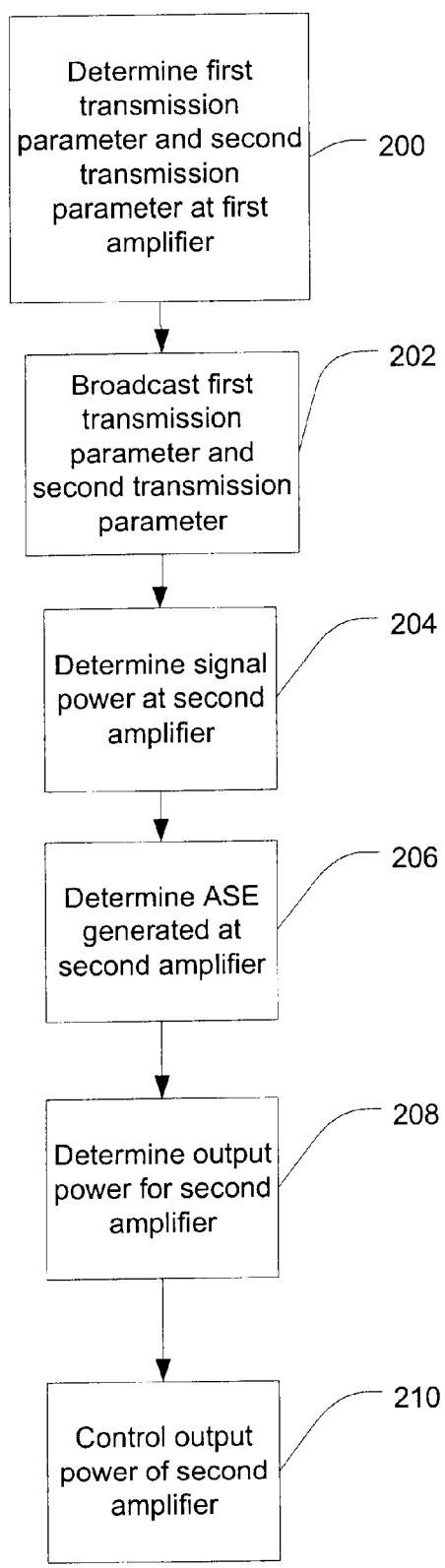
FIG. 7 is a flowchart of a method of controlling amplifier power in a second embodiment of the invention.

An exemplary process of controlling the output power of an amplifier, where channels may be added or blocked, is depicted in FIG. 7. At step 200, the first transmission parameter (e.g., composite express signal-to-noise ratio) and second transmission parameter (e.g., composite express signal-to-noise ratio and composite signal-to-noise ratio) are determined for a first amplifier. These transmission parameters are broadcast to other network elements at step 202. At step 204, signal output power for the second amplifier is determined and at step 206, amplified spontaneous emission generated at the second amplifier is determined. The output power for the second amplifier is determined at step 208 is response to the first transmission parameter, the second transmission parameter, the signal output power for the second amplifier and amplified spontaneous emission generated at the second amplifier. This determined value is then used to control output power of the second amplifier at step 210.

Figure 8:
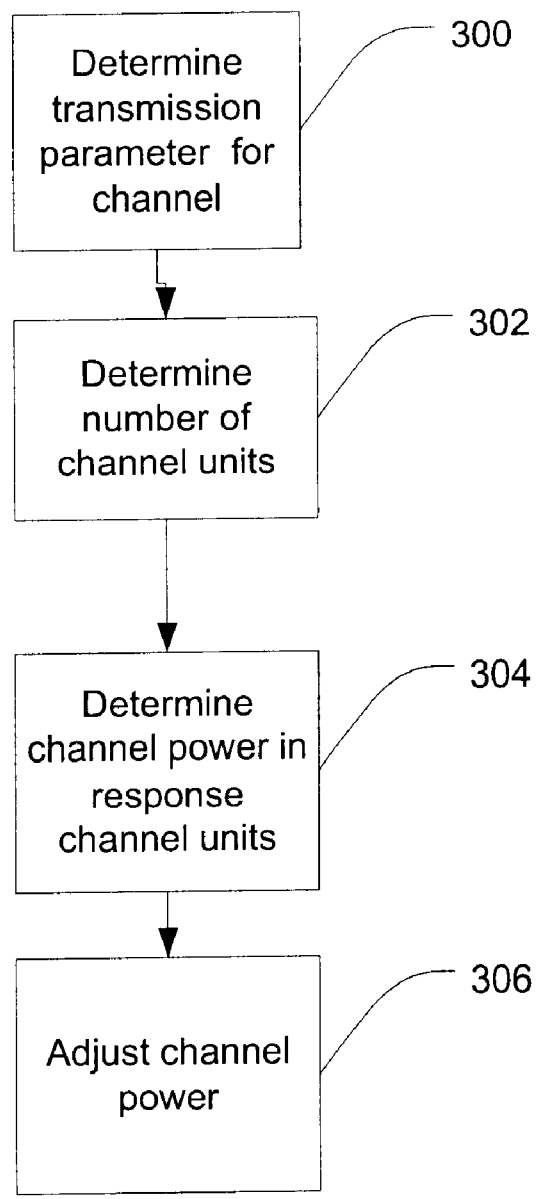
FIG. 8 is a flowchart of a method of determining channel power in an exemplary embodiment of the invention.

The channel count variable N used in the above equations may be dependent upon transmission parameters such as transmission rate and transmission format of the signal. A channel may be weighted as multiple channel units depending on transmission rate and transmission format. FIG. 8 is a flowchart of a process for determining the number of channel units corresponding to channel. The method may be implemented by an NCP 64 in response to a computer program in a storage medium accessible by the NCP.

Referring to FIG. 8, the process begins at step 300 where at least one transmission parameter is determined for a channel. Transmission parameters may relate to transmission rate (e.g., bps) or transmission format (e.g., the use of forward error correction). At step 302, the number of channel units for the channel are determined. The determination of the number of channel units may be based on any number of transmission parameters. Once the number of channel units is determined, the power for the channel is determined at step 304. The channel power may be determined based on the number of channel units multiplied by a power per channel unit value. The channel power can then be controlled as shown at step 306.

In an exemplary embodiment, a signal having a transmission rate of 2.5 Gbps is weighted as 1 channel unit. A signal having a 10 Gbps transmission rate using forward error correction is weighted as 2 channel units. A signal having a 10 Gbps transmission rate without forward error correction is weighted as 4 channel units. The presence of higher weighted channels will increase the power requirements of the amplifiers. Table A below depicts exemplary channel units and the associated channel power for different transmission rates and transmission formats. The variable x represents a power per channel unit value.

TABLE A

| Channel Number | Transmission Rate | Transmission Format | Channel Units | Channel Power |
|---|---|---|---|---|
| 1 | 2.5 Gbps | FEC | 1 | 1× |
| 2 | 10 Gbps | FEC | 2 | 2× |
| 3 | 10 Gbps | non-FEC | 4 | 4× |

The processing performed to determine the total output power may be implemented by a microprocessor-based NCP. Thus, the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of controlling amplifier output power in an optical communications network, the method comprising:
    for a first amplifier, determining a first transmission parameter associated with the output power of the first amplifier;
    for a second amplifier downstream from the first amplifier:
        determining a first signal output power for the second amplifier;
        determining an amount of amplified spontaneous emission generated at the second amplifier;
        determining an output power for the second amplifier in response to the first signal output power, the first transmission parameter and the amount of amplified spontaneous emission generated at the second amplifier; and
        controlling output power of the second amplifier in response to the determined output power for the second amplifier,
    wherein the first transmission parameter for the first amplifier is a composite express signal-to-noise ratio.

2. The method of claim 1 wherein the composite express signal-to-noise ratio is determined by:
    determining a first signal output power for the first amplifier;
    determining a composite express output power for the first amplifier; and
    determining a composite express signal-to-noise ratio in response to the first signal output power and the composite express output power.

3. The method of claim 1 further comprising broadcasting the first transmission parameter to downstream amplifiers in the optical communications network.

4. The method of claim 1 further comprising broadcasting the first transmission parameter to upstream and downstream amplifiers in the optical communications network.

5. A method of controlling amplifier output power in an optical communications network, the method comprising:
    for a first amplifier, determining a first transmission parameter associated with the output power of the first amplifier;
    for a second amplifier downstream from the first amplifier:
        determining a first signal output power for the second amplifier;
        determining an amount of amplified spontaneous emission generated at the second amplifier;
        determining an output power for the second amplifier in response to the first signal output power, the first transmission parameter and the amount of amplified spontaneous emission generated at the second amplifier; and
        controlling output power of the second amplifier in response to the determined output power for the second amplifier,
    wherein said controlling output power of the second amplifier includes adding a power offset to provide for a service channel.

6. An optical communications network comprising:
    a first amplifier;
    a processor associated with said first amplifier, said processor associated with said first amplifier determining a first transmission parameter associated with the output power of said first amplifier;
    a second amplifier downstream from said first amplifier
    a processor associated with said second amplifier, said processor associated with said second amplifier:
        determining a first signal output power for said second amplifier;
        determining an amount of amplified spontaneous emission generated at said second amplifier;
        determining an output power for said second amplifier in response to the first signal output power, the first transmission parameter and the amount of amplified spontaneous emission generated at said second amplifier; and
        controlling output power of said second amplifier in response to the determined output power for said second amplifier.

7. The network of claim 6, wherein the composite express signal-to-noise ratio is determined by:
    determining a first signal output power for said first amplifier;
    determining a composite express output power for said first amplifier; and
    determining a composite express signal-to-noise ratio in response to the first signal output power and the composite express output power.

8. The network of claim 6 wherein said processor associated with said first amplifier broadcasts the first transmission parameter to downstream amplifiers in the optical communications network.

9. The network of claim 6 wherein said processor associated with said first amplifier broadcasts the first transmission parameter to upstream and downstream amplifiers in the optical communications network.

10. The network of claim 6 wherein said processor associated with said first amplifier and said processor associated with said second amplifier are the same processor.

11. The network of claim 6 wherein said processor associated with said first amplifier and said processor associated with said second amplifier are separate processors.

12. An optical communications network comprising:

a first amplifier;

a processor associated with said first amplifier, said processor associated with said first amplifier determining a first transmission parameter associated with the output power of said first amplifier;

a second amplifier downstream from said first amplifier a processor associated with said second amplifier, said processor associated with said second amplifier:
  determining a first signal output power for said second amplifier;
  determining an amount of amplified spontaneous emission generated at said second amplifier;
  determining an output power for said second amplifier in response to the first signal output power, the first transmission parameter and the amount of amplified spontaneous emission generated at said second amplifier; and controlling output power of said second amplifier in response to the determined output power for said second amplifier, wherein said processor associated with said second amplifier controls output power of said second amplifier by adding a power offset to provide for a service channel.

* * * * *